(12) United States Patent
Fang et al.

(10) Patent No.: US 10,797,605 B2
(45) Date of Patent: Oct. 6, 2020

(54) RESONANT SWITCHING CONVERTER

(71) Applicant: Silergy Semiconductor Technology (Hangzhou) LTD, Hangzhou, Zhejiang Province (CN)

(72) Inventors: Chiqing Fang, Hangzhou (CN); Kaiwei Yao, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/558,465

(22) Filed: Sep. 3, 2019

(65) Prior Publication Data
US 2020/0091828 A1    Mar. 19, 2020

(30) Foreign Application Priority Data
Sep. 19, 2018  (CN) .......................... 2018 1 1098832

(51) Int. Cl.
*H02M 3/335* (2006.01)
*H02M 1/08* (2006.01)
*H02M 1/00* (2006.01)

(52) U.S. Cl.
CPC ....... *H02M 3/33569* (2013.01); *H02M 1/083* (2013.01); *H02M 2001/0058* (2013.01)

(58) Field of Classification Search
CPC ..... H02M 3/33569; H02M 2007/4835; H02M 7/483
See application file for complete search history.

(56) References Cited

U.S. PATENT DOCUMENTS

| 8,581,518 | B2 | 11/2013 | Kuang et al. |
| 2011/0127925 | A1 | 6/2011 | Huang et al. |
| 2017/0318639 | A1 | 11/2017 | Wang et al. |
| 2018/0295685 | A1 | 10/2018 | Wang et al. |
| 2018/0295690 | A1 | 10/2018 | Chen et al. |
| 2018/0310376 | A1 | 10/2018 | Huang et al. |

OTHER PUBLICATIONS

Tanaka et al., A DC power supply using flying-capacitor three-level PFC and LLC resonant three-level DC/DC converter . . . , Jul. 1, 2017,IEEE, IFEEC 2017-ECCE Asia, 517-521 (Year: 2017).*

* cited by examiner

*Primary Examiner* — Jue Zhang
(74) *Attorney, Agent, or Firm* — Michael C. Stephens, Jr.

(57) ABSTRACT

A resonant switching converter can include: a multi-level generating circuit configured to generate a first voltage signal having at least two values, where the first voltage signal is zero in a first time interval, and is not zero and not greater than an input voltage of the resonant switching converter in a second time interval; and a resonant tank configured to multiplex at least two power transistors in the multi-level generating circuit, and to receive the first voltage signal to achieve resonant control.

19 Claims, 13 Drawing Sheets

RESONANT SWITCHING CONVERTER

RELATED APPLICATIONS

This application claims the benefit of Chinese Patent Application No. 201811098832.6, filed on Sep. 19, 2018, which is incorporated herein by reference in its entirety.

FIELD OF THE INVENTION

The present invention generally relates to the field of power electronics, and more particularly to resonant switching converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Figure 1A:
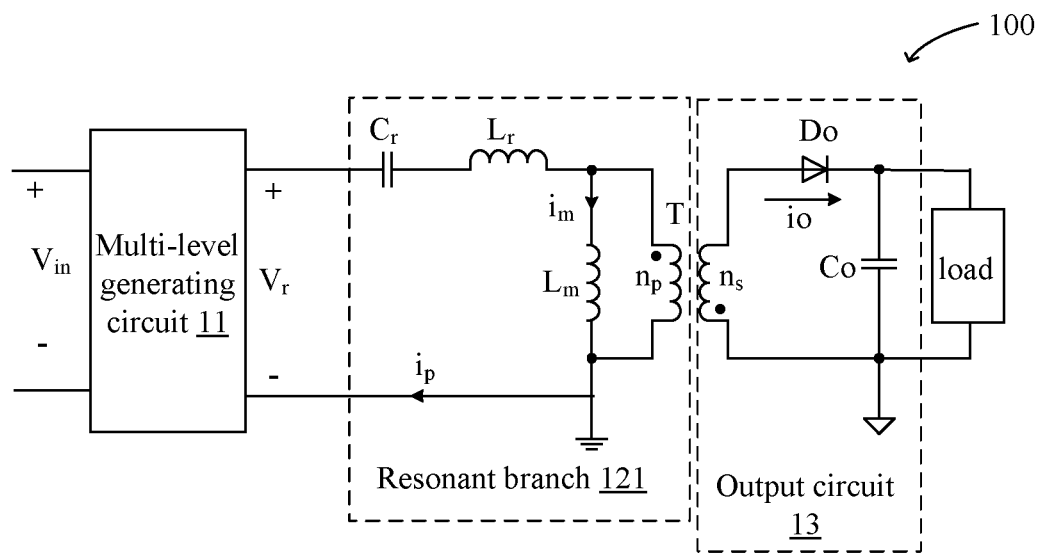
FIG. 1A is a schematic block diagram of a first example resonant switching converter, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

With the development of power electronics, switching converters have become more and more widely used. Correspondingly, the design of switching converters is also facing more and more challenges, including comprehensive performance requirements of high power density, high efficiency, fast speed and dynamic characteristics, and so on. In order to achieve higher power density, the approach of increasing the switching frequency is generally utilized to reduce the capacitance and the volume of magnetic components, such as transformers and inductors, but the increase of the switching frequency leads to an increase in switching loss, thereby reducing the efficiency of the switching converter.

Soft switching technology is one approach for the switching converter to achieve high frequency operation. Using the principle of resonance, the current or voltage of the power devices in the switching converter varies with the quasi-sinusoidal law, thereby realizing soft switching, and solving potential problems of hard switching loss in the hard switching converter, capacitive conduction, inductive shutdown, reverse diode recovery, and electromagnetic interference (EMI), that may be caused by hard switching. Isolated converters (e.g., flyback converters, forward converters, half-bridge converters, etc.) can realize soft switching by use of quasi-resonant, but potential drawbacks of this approach can include large stresses of the power devices, large power losses, low power density caused by limitation of the switching frequency, and large turns ratio and volume of the transformer.

In one embodiment, a resonant switching converter can include: (i) a multi-level generating circuit configured to generate a first voltage signal having at least two values, where the first voltage signal is zero in a first time interval, and is not zero and not greater than an input voltage of the resonant switching converter in a second time interval; and (ii) a resonant tank configured to multiplex at least two power transistors in the multi-level generating circuit, and to receive the first voltage signal to achieve resonant control.

Referring now to FIG. 1A, shown is a schematic block diagram of a first example resonant switching converter, in accordance with embodiments of the present invention. In this particular example, resonant switching converter 100 is an isolated switching converter including transformer T. Resonant switching converter 100 can include multi-level generating circuit 11, and a resonant tank that includes resonant branch 121 and output circuit 13. Multi-level generating circuit 11 including at least two power transistors can receive input voltage $V_{in}$, and generate voltage signal $V_r$ having at least two values.

In each switching cycle, voltage signal $V_r$ can include a first type time interval in which the value of voltage signal $V_r$ is zero, and a second type time interval in which the value of voltage signal $V_r$ is not zero and not greater than input voltage $V_{in}$. The first and second type time intervals can change alternately, and each switching cycle can include at least one first type time interval and one second type time interval. In one switching cycle, the length of the first type time interval may be less than half of the switching cycle, in order to facilitate resonant control. The resonant tank can include at least two power transistors in multi-level generating circuit 11, and resonant branch 121 can include resonant capacitor $C_r$ and resonant inductor $L_r$. By multiplexing at least two power transistors in multi-level generating circuit 11, voltage signal $V_r$ can be provided to input terminals of resonant branch 121, thereby achieving resonance control. Output circuit 13 can be coupled to the resonant tank to generate an output electrical signal to drive a load accordingly.

In the flyback converter topology example of FIG. 1A, resonant branch 121 can include resonant capacitor $C_r$, resonant inductor $L_r$, magnetic inductance $L_m$, and primary winding $n_P$ of transformer T connected in series between two terminals of voltage signal $V_r$. Output circuit 13 can include series-connected secondary winding $n_S$ of transformer T, freewheeling diode Do, and output capacitor Co. It should be understood that the actual transformer can be equivalent to a combination of leakage inductance, magnetic inductance, and an ideal transformer. In practical applications, the leakage inductance may be used as a resonant inductance. As an alternatively example, resonant inductor Lr may be the leakage inductance of the transformer, or it may be a separate inductor or a combination of a separate inductor and the leakage inductance of the transformer.

During operation, the value of voltage signal $V_r$ can vary alternately according to particular application requirements, and can be maintained at a value not greater than input voltage $V_{in}$. In each switching cycle T, when the value of voltage signal $V_r$ is not zero and not greater than input voltage $V_{in}$, magnetic inductor current $i_m$ and primary winding current $i_p$ can increase linearly, and the values of both may be equal. Freewheeling diode Do in output circuit 13 may have no current flowing therethrough. When the value of voltage signal $V_r$ is switched to zero, magnetic inductor current $i_m$ may decrease linearly, primary winding current $i_p$ can be a resonant current, and the difference between magnetic inductor current $i_m$ and primary winding current $i_p$ may be provided to output circuit 13 though secondary winding $n_s$, such that current io may flow through freewheeling diode Do. Repeatedly, as the value of voltage signal $V_r$ is switched, the values of magnetic inductor current $i_m$ and primary winding current $i_p$ can be cyclically switched, and output circuit 13 can generate a corresponding output electrical signal. In particular applications, the change magnitude of the value of voltage signal $V_r$ and the length of the first and second type time intervals can be flexibly set according to particular requirements.

Figure 1B:
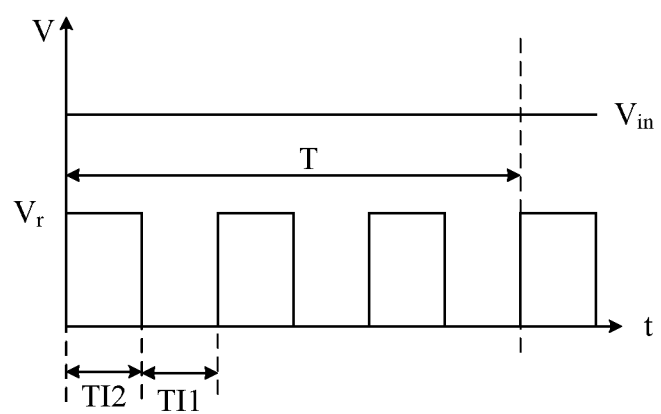
FIG. 1B is a waveform diagram of example variation of a first voltage signal with time under a first operating mode, in accordance with an embodiment of the present invention.

Referring now to FIG. 1B, shown is a waveform diagram of example variation of a first voltage signal with time under a first operating mode, in accordance with embodiments of the present invention. In this particular example, the value of input voltage $V_{in}$ is an integral multiple of the non-zero value of voltage signal $V_r$ (e.g., the integral multiple of 2 times, 3 times, etc.). In each switching cycle T, the first type time interval in which voltage signal $V_r$ is zero, and the second type time interval in which voltage signal $V_r$ is not zero and not greater than input voltage $V_{in}$ can change alternately. The frequency of the alternating change of first type time interval TI1 and second type time interval TI2 may be an integral multiple of the switching frequency of the resonant switching converter (e.g., 2 times, 3 times, etc.).

Figure 1C:
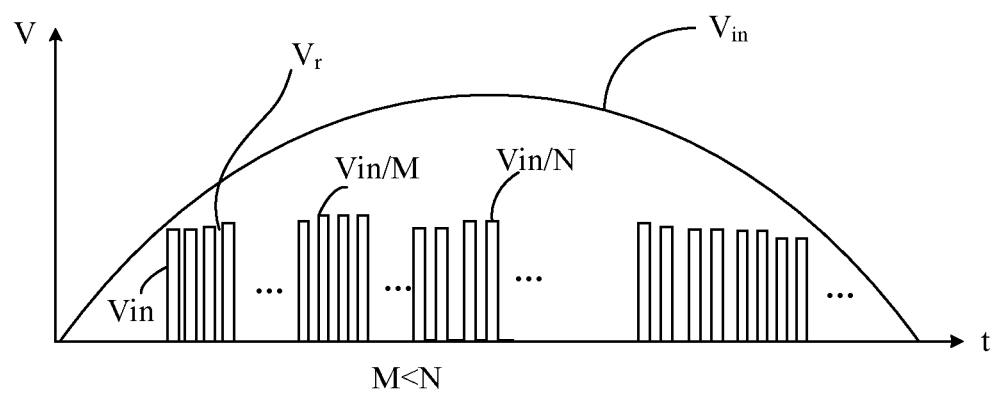
FIG. 1C is waveform diagram of example variation of a first voltage signal with time under a second operating mode, in accordance with embodiments of the present invention.

Referring now to FIG. 1C, shown is a waveform diagram of example variation of a first voltage signal with time under a second operating mode, in accordance with embodiments of the present invention. In this particular example, the non-zero values of voltage signal $V_r$ may be different. When the value of input voltage $V_{in}$ changes (e.g., as an alternating current voltage), a ratio of voltage signal $V_r$ to input voltage $V_{in}$ can be set correspondingly, such that voltage signal $V_r$ is always maintained at a relatively small value. For example, when the value of input voltage $V_{in}$ is relatively small, ratio 1/M of voltage signal $V_r$ to input voltage $V_{in}$ may be relatively large. Similarly, when the value of input voltage $V_{in}$ is relatively large, ratio 1/1 N of voltage signal $V_r$ to input voltage $V_{in}$ may be relatively small. In this way, voltage signal $V_r$ input to the resonant branch may be decreased by changing the ratio of voltage signal $V_r$ to input voltage $V_{in}$, such that the performance requirements of the components in the switching converter may be reduced.

With this example resonant switching converter, the resonant tank can multiplex part or all of the power transistors in the multi-level generating circuit, in order to reduce and control the input voltage of the resonant branch, thereby reducing the withstand voltage of the power transistors in the resonant tank, the voltage stress of the power transistor, and the switching loss. Also, the withstand voltage of the resonant components and the withstand voltage requirement of the freewheeling diode may correspondingly be reduced. For the isolated topology with the transformer, the requirement for the turns ratio of the transformer may also be reduced. On the other hand, in one switching cycle, the first voltage signals having the same value can be generated by switching conduction paths of the multi-level generating circuit, which may be equivalent to increasing the switching frequency, and can be more advantageous for achieving high frequency operation, reducing the size and cost of the system circuit.

Different implementations of the multi-level generation circuit and the resonant tank sharing portion or all of the power transistors will be respectively exemplified below. For example, the multi-level generating circuit can include 2 N power transistors connected in series between two terminals of input voltage $V_{in}$, which result in 2 N−1 common nodes between the 2 N power transistors. The multi-level generating circuit can also include M first capacitors connected in series between the (N−M)th and (N+M)th of the common nodes; where N≥2, 1≤M≤(N−1). The two output terminals of the multi-level generating circuit can be the Nth common node and the negative terminal of input voltage $V_{in}$ or the Nth common node and the positive terminal of input voltage $V_{in}$. The switching states of the 2 N power transistors can be controlled to generate voltage signal $V_r$ at the output terminals of the multi-level generating circuit and can be supplied to resonant branch 121. The non-zero value of voltage signal $V_r$ may be a value, such as $V_{in}/N$, $2V_{in}/N$, or the like.

Figure 2A:
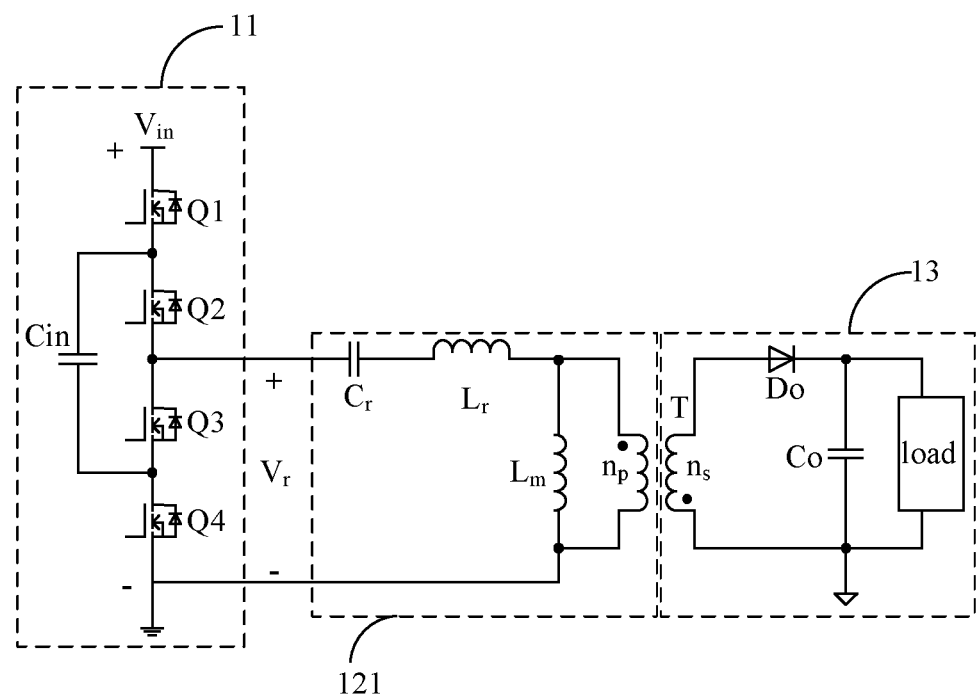
FIG. 2A is a schematic block diagram of a second example resonant switching converter, in accordance with embodiments of the present invention.

Referring now to FIG. 2A, shown is a schematic block diagram of a second example resonant switching converter, in accordance with embodiments of the present invention. In this example, multi-level generating circuit 11 can include four power transistors Q1, Q2, Q3, and Q4 connected in series between two terminals of input voltage $V_{in}$, which results in three common nodes between the four power transistors, and capacitor Ci. Capacitor Cin can connect between the first and third common nodes. The output terminals of multi-level generating circuit 11 are the second common node between transistors Q2 and Q3 and a ground terminal (e.g., the negative terminal of input voltage $V_{in}$), and can connect to the input terminals of resonant branch 121. By controlling the switching states of four power transistors Q1, Q2, Q3, and Q4, various resonant controls can be realized with different equivalent switching frequencies and different input voltages of resonant branch 121.

Figure 2B:
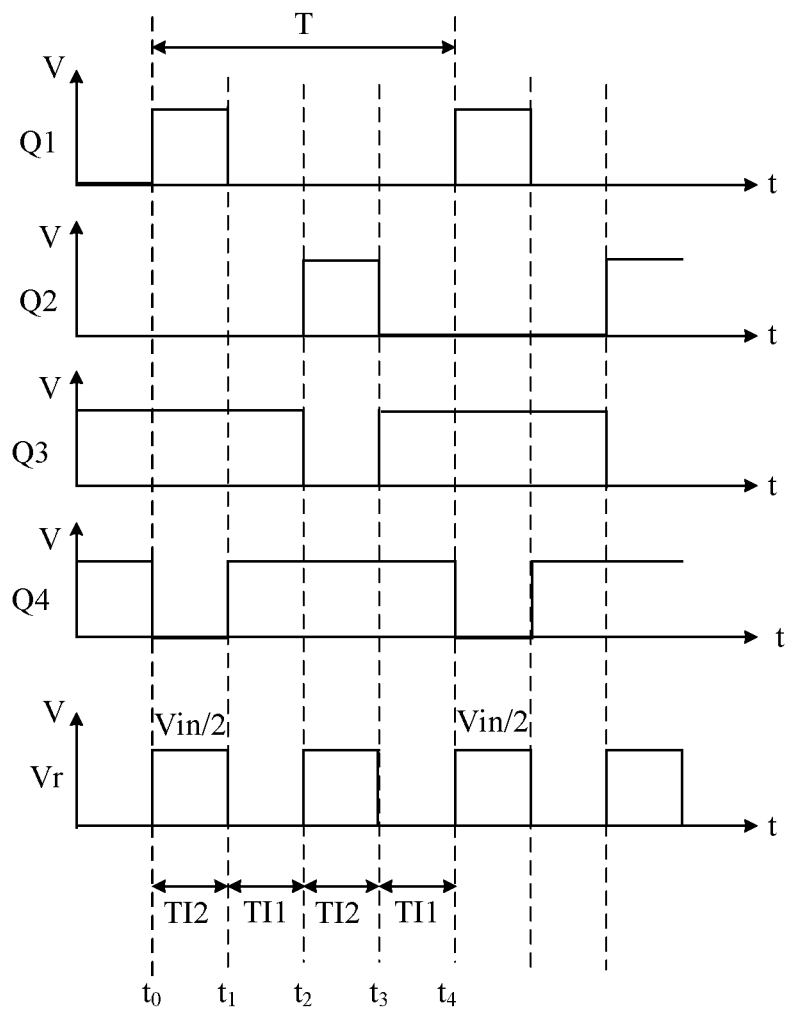
FIG. 2B is a waveform diagram of example operation of a multi-level generating circuit in FIG. 2A in a first operating mode, in accordance with embodiments of the present invention.

Referring now to FIG. 2B, shown is a waveform diagram of example operation of a multi-level generating circuit in FIG. 2A in a first operating mode, in accordance with embodiments of the present invention. In the first operating mode, the resonant tank that multiplexes power transistors in multi-level generating circuit 11 may have an equivalent twice the switching frequency, and the non-zero value of voltage signal $V_r$ may be half of input voltage $V_{in}$. During each switching cycle T, multi-level generating circuit 11 may have four operating states, namely time intervals [$t_0$-$t_1$], [$t_1$-$t_2$], [$t_2$-$t_3$], and [$t_3$-$t_4$], and time intervals TI1 and TI2 can change alternately.

During time interval $t_0$-$t_1$, power transistors Q1 and Q3 can be turned on at the same time, and power transistors Q2 and Q4 may be turned off. The conduction path can be $V_{in}$-Q1-Cin-Q3-Cr-Lr-Lm—ground terminal. The value of voltage signal $V_r$ may be the difference between input voltage $V_{in}$ and the voltage across capacitor Cin; that is, half of the input voltage $V_{in}/2$, and may be transmitted to the input terminals of resonant branch 121. In this way, magnetic inductor current $i_m$ and primary winding current $i_p$ may both increase linearly, and the values of both can be equal, such that transformer T can store energy, no energy is transmitted to a secondary side of transformer T, and no current may flow through freewheeling diode Do.

During time interval $t_1$-$t_2$, power transistors Q3 and Q4 may be turned on at the same time, and power transistors Q1 and Q2 can be turned off. The conduction path may be Q4-Q3-Cr-Lr-Lm ($n_p$)—ground terminal. The value of voltage signal $V_r$ can be switched to zero. In this way, magnetic inductor current $i_m$ can decrease linearly, and primary winding current $i_p$ is the resonant current, such that the difference between magnetic inductor current $i_m$ and primary winding current $i_p$ can be transmitted to output circuit 13 through secondary winding $n_s$, and a current may flow through freewheeling diode Do.

During $t_2$-$t_3$ time interval, power transistors Q2 and Q4 may be turned on at the same time, and power transistors Q1 and Q3 can be turned off. The conduction path may be the positive terminal of capacitor Cin-Q2-Cr-Lr-Lm-Q4—the negative terminal of capacitor Cin (e.g., ground terminal). The value of voltage signal Vr may be the difference between input voltage Vin and the voltage across capacitor Cin; that is, half of the input voltage Vin/2, and can be transmitted to the input terminals of resonant branch 121. In this way, magnetic inductor current $i_m$ and primary winding current $i_p$ may both increase linearly, and the values of the both can be equal, such that transformer T can store energy, no energy is transmitted to the secondary side of transformer T, and no current may flow through freewheeling diode Do.

During $t_3$-$t_4$ time interval, power transistors Q3 and Q4 may be turned on again at the same time, and power transistors Q1 and Q2 can be turned off. The conduction path may be Q4-Q3-Cr-Lr-Lm (np)—ground terminal. The value of voltage signal $V_r$ may be switched to zero. In this way, magnetic inductor current $i_m$ can decrease linearly, and primary winding current $i_p$ can be the resonant current, such that the difference between magnetic inductor current im and primary winding current $i_p$ can be transmitted to output circuit 13 through secondary winding $n_s$, and a current may flow through freewheeling diode Do. Repeatedly, as the value of voltage signal $V_r$ is switched, the values of magnetic inductor current $i_m$ and primary winding current $i_p$ are cyclically switched, and output circuit 13 can generate the corresponding output electrical signal.

In this example, the resonant switching converter can be regarded as an asymmetric half-bridge flyback converter, and may multiplex the power switches in the multi-level generation circuit, namely power transistors Q1, Q2, Q3, and Q4. In different operating states, two of power transistors Q1, Q2, Q3, and Q4 can replace a single main switch and clamp switch of an asymmetric half-bridge flyback converter, respectively. Further, power transistors Q1 and Q3 may simultaneously be turned on in time interval $t_0$-$t_1$, and power transistors Q2 and Q4 can simultaneously be turned on in time interval $t_2$-$t_3$, which is equivalent to the main switch in the asymmetric half-bridge flyback converter. Power transistors Q3 and Q4 may simultaneously be turned on in time intervals $t_1$-$t_2$ and $t_3$-$t_4$, which can be equivalent to the clamp switch of the asymmetric half-bridge flyback converter. In this example, the maximum voltage stress of power transistors Q1, Q2, Q3, and Q4 can be decreased to $V_{in}/2$ based on the control and switching for the values of voltage signal $V_r$ generated by the multi-level generating circuit, and the switching stress and switching losses are lowered accordingly. For the isolated topology with the transformer, the requirement for the turns ratio of the transformer may also be reduced. On the other hand, in one switching cycle, two resonance control processes can be completed, which may be equivalent to increasing the switching frequency of the resonant tank, and is more advantageous for achieving high frequency operation, reducing the size and cost of the system circuit.

Figure 2C:
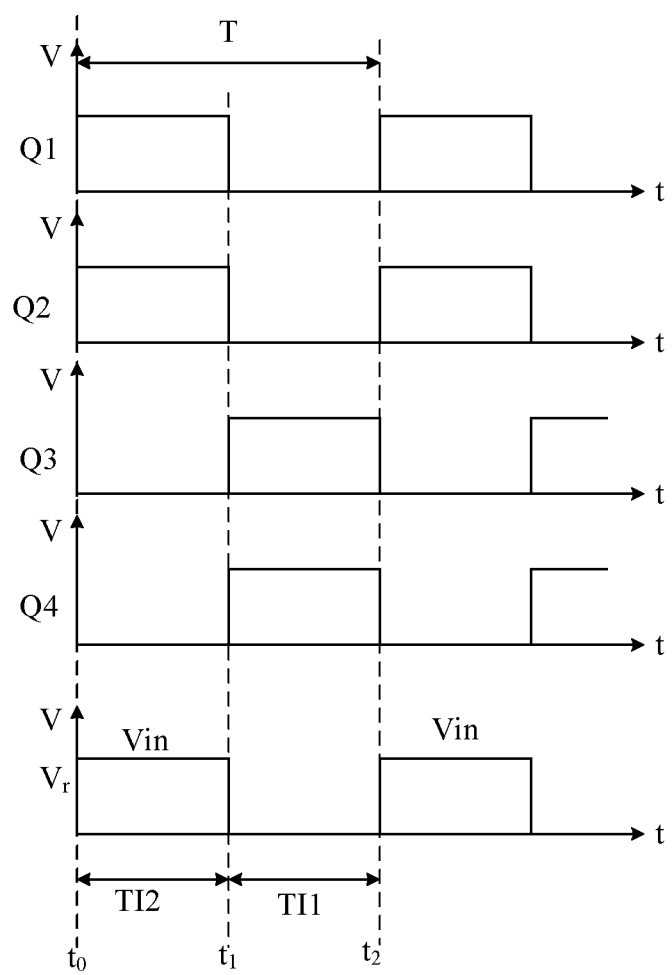
FIG. 2C is a waveform diagram of example operation of a multi-level generating circuit in FIG. 2A in a second operating mode, in accordance with embodiments of the present invention.

Referring now to FIG. 2C, shown is a waveform diagram of example operation of a multi-level generating circuit in FIG. 2A in a second operating mode, in accordance with embodiments of the present invention. In the second operating mode, multi-level generating circuit 11 may have two operating states during each switching cycle T, namely time intervals [$t_0$-$t_1$], [$t_1$-$t_2$]. During time interval $t_0$-$t_1$, power transistors Q1 and Q2 can be turned on at the same time, and power transistors Q3 and Q4 may be turned off. The conduction path is Vin-Q1-Q2-Cr-Lr-Lm—ground potential. The value of voltage signal $V_r$ can be input voltage $V_{in}$, and is transmitted to the input terminals of resonant branch 121. In this way, magnetic inductor current $i_m$ and primary winding current $i_p$ may both increase linearly, and the values of the both are equal, such that transformer T can store energy, no energy is transmitted to a secondary side of transformer T, and no current may flow through freewheeling diode Do.

During time interval $t_1$-$t_2$, power transistors Q3 and Q4 may be turned on at the same time, and power transistors Q1 and Q2 can be turned off. The conduction path may be Q4-Q3-Cr-Lr-Lm (np)—ground terminal. The value of voltage signal $V_r$ can be switched to zero. In this way, magnetic inductor current $i_m$ can decrease linearly, and primary winding current $i_p$ may be the resonant current, such that the difference between magnetic inductor current $i_m$ and primary winding current $i_p$ can be transmitted to output circuit 13 through secondary winding $n_s$, and a current may flow through freewheeling diode Do.

In this example, power transistors Q1 and Q2 are simultaneously turned on during time interval $t_0$-$t_1$, which may be equivalent to the main switch in the asymmetric half-bridge flyback converter. Power transistors Q3 and Q4 can simultaneously be turned on during time interval $t_1$-$t_2$, which may be equivalent to the clamp switch in the asymmetric half-bridge flyback converter. When the value of input voltage $V_{in}$ is varied, for example, as the AC input voltage, the two operating modes shown in FIGS. 2B and 2C can be switched according to the value of input voltage $V_{in}$. When the value of input voltage $V_{in}$ is relatively small, the operation mode shown in FIG. 2C can be selected, and the value of input voltage $V_{in}$ may not be converted, but rather maintained as input voltage Vin. When the value of input voltage $V_{in}$ is relatively large, the operation mode shown in FIG. 2B can be selected, and the value of input voltage $V_{in}$ may be converted, in order to decrease the value of voltage signal $V_r$ input to the resonance branch, such that the input voltage of the resonant tank is always maintained at a relatively small value.

Figure 2D:
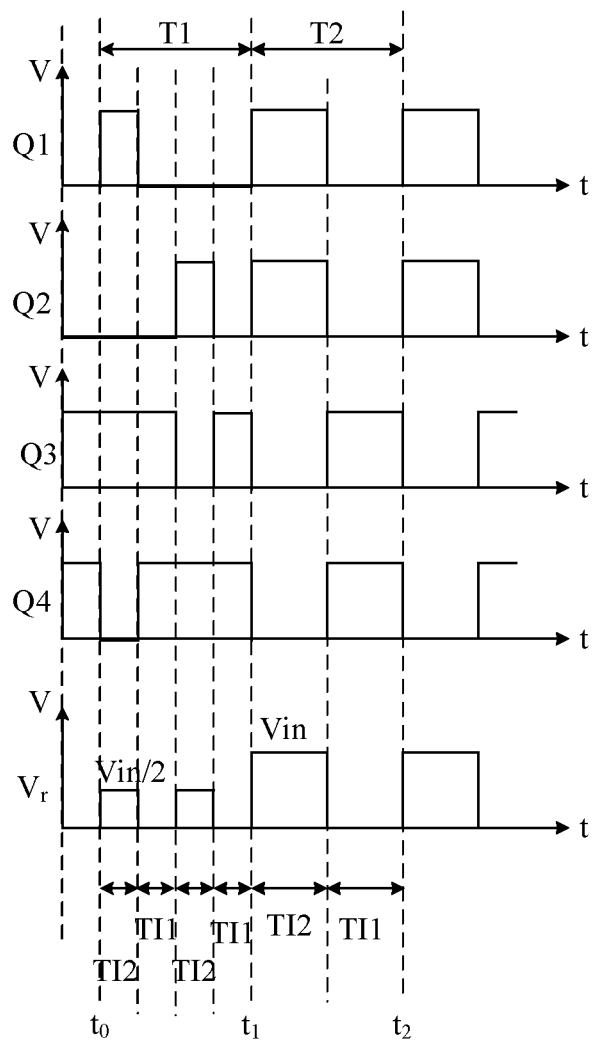
FIG. 2D is a waveform diagram of example operation of a multi-level generating circuit in FIG. 2A in a third operating mode, in accordance with embodiments of the present invention.

Referring now to FIG. 2D, shown is a waveform diagram of example operation of a multi-level generating circuit in FIG. 2A in a third operating mode, in accordance with embodiments of the present invention. During time interval $t_0$ to $t_1$ in switching period T, the value of voltage signal $V_r$ in the second type time interval (TI2) may be $\frac{1}{2}V_{in}$. During time interval $t_1$ to $t_2$ in switching period T, the value of voltage signal $V_r$ in the second type time interval may be $V_{in}$. Further, the value of voltage signal $V_r$ in the second type time interval can be set by adjusting circuit structures of multi-level generating circuit 11 (e.g., $\frac{1}{4}V_{in}$, $\frac{1}{3}V_{in}$, etc.).

Figure 2E:
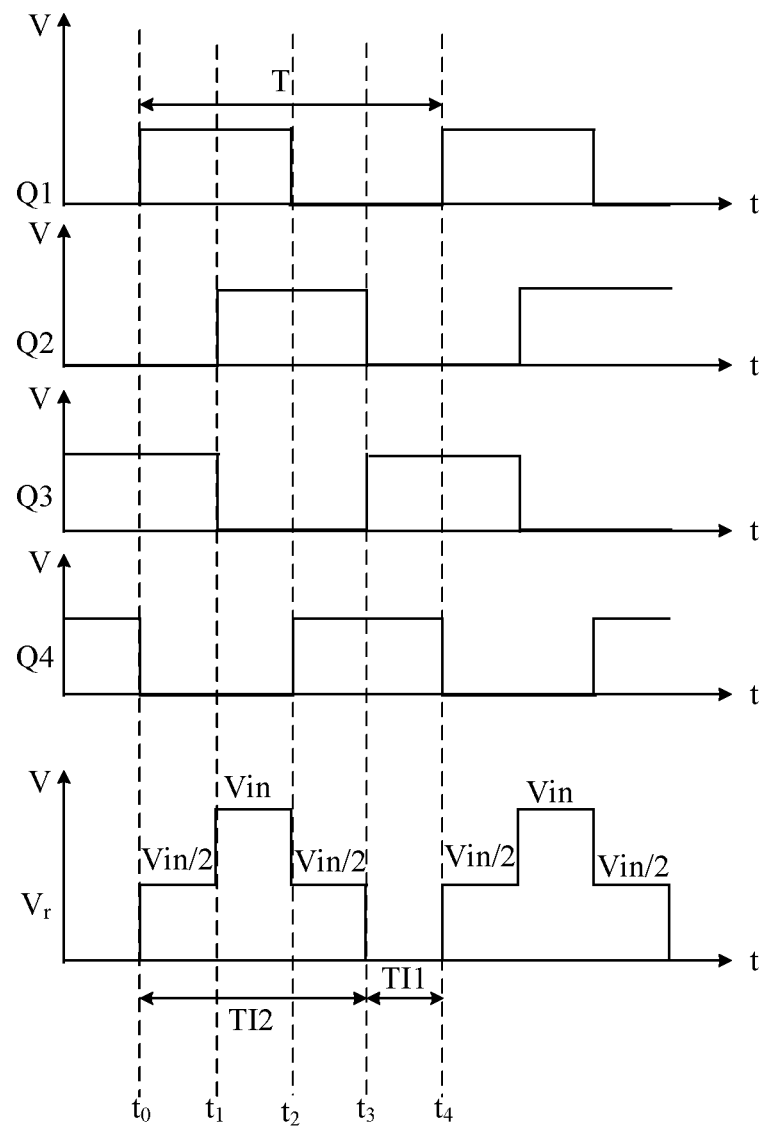
FIG. 2E is a waveform diagram of example operation of a multi-level generating circuit in FIG. 2A in a fourth operating mode, in accordance with embodiments of the present invention.

Referring now to FIG. 2E, shown is a waveform diagram of example operation of a multi-level generating circuit in FIG. 2A in a fourth operating mode, in accordance with embodiments of the present invention. In the fourth operating mode, multi-level generating circuit 11 may have four operating states during each switching cycle T, namely time intervals [$t_0$-$t_1$], [$t_1$-$t_2$], [$t_2$-$t_3$] and [$t_3$-$t_4$]. In this particular example, first type time interval TI1 can be from t3 to t4, and second type time interval TI2 can be from $t_0$ to $t_3$.

During time interval $t_0$-$t_1$, power transistors Q1 and Q3 may be turned on at the same time, and power transistors Q2 and Q4 can be turned off. The conduction path is Vin-Q1-Cin-Q3-Cr-Lr-Lm—ground terminal. The value of voltage signal $V_r$ can be the difference between input voltage $V_{in}$ and the voltage across capacitor Cin; that is, half of the input voltage $V_{in}/2$, and may be transmitted to the input terminals of resonant branch 121. In this way, magnetic inductor current $i_m$ and primary winding current $i_p$ may both increase linearly, and the values of the both are equal, such that transformer T can store energy, no energy may be transmitted to a secondary side of transformer T, and no current may flow through freewheeling diode Do.

During $t_1$-$t_2$ time interval, power transistors Q1 and Q2 can be turned on at the same time, and power transistors Q3 and Q4 may be turned off. The conduction path is Q1-Q2-Cr-Lr-Lm—ground terminal. The value of voltage signal $V_r$ may be input voltage $V_{in}$ and may be transmitted to the input terminals of resonant branch 121. In this way, magnetic inductor current im and primary winding current $i_p$ can increase linearly with a relatively large slope, and the values of the both are equal, such that transformer T can store energy, no energy may be transmitted to the secondary side of transformer T, and no current may flow through freewheeling diode Do.

During $t_2$-$t_3$ time interval, power transistors Q2 and Q4 may be turned on at the same time, and power transistors Q1 and Q3 can be turned off. The conduction path is the positive terminal of Cin-Q2-Cr-Lr-Lm-Q4-negative terminal of Cin (e.g., ground terminal). The value of voltage signal $V_r$ may be the difference between input voltage Vin and the voltage across capacitor Cin, that is, half of the input voltage $V_{in}/2$, and can be transmitted to the input terminals of resonant branch 121. In this way, magnetic inductor current $i_m$ and primary winding current $i_p$ may both increase linearly, and the values of both can be equal, such that transformer T can store energy, no energy may be transmitted to a secondary side of transformer T, and no current may flow through freewheeling diode Do.

During $t_3$-$t_4$ time interval, power transistors Q3 and Q4 may be turned on at the same time, and power transistors Q1 and Q2 can be turned off. The conduction path is Q4-Q3-Cr-Lr-Lm (np)—ground terminal. The value of voltage signal $V_r$ may be switched to zero. In this way, magnetic inductor current $i_m$ can decrease linearly, and primary winding current $i_p$ is the resonant current, such that the difference between magnetic inductor current $i_m$ and primary winding current $i_p$ may be transmitted to output circuit 13 through secondary winding $n_s$, and a current may flow through freewheeling diode Do. Repeatedly, as the value of voltage signal Vr is switched, the values of magnetic inductor current $i_m$ and primary winding current $i_p$ can be cyclically switched, and output circuit 13 can generate the corresponding output electrical signal.

In this example, the resonant switching converter can be regarded as the asymmetric half-bridge flyback converter, and can multiplex the power switches in the multi-level generation circuit, namely power transistors Q1, Q2, Q3, and Q4. In different operating states, two of power transistors Q1, Q2, Q3, and Q4 can replace a single main switch and clamp switch of an asymmetric half-bridge flyback converter, respectively. In an operating state in which the value of voltage signal $V_r$ may not be zero, the two power transistors in on states may correspond to the main switch of the asymmetric half-bridge flyback converter, for example, power transistors Q1 and Q3 that are in on states in time interval [$t_0$-$t_1$], power transistors Q1 and Q2 that are in on states in time interval [$t_1$-$t_2$] and power transistors Q2 and Q4 are that in on states in time interval [$t_2$-$t_3$].

In an operating mode in which the value of voltage signal $V_r$ is zero, the two power transistors in on states may correspond to the clamp switch of the asymmetric half-bridge flyback converter, for example, power transistor Q3 and Q4 are in on states in time interval [$t_3$-$t_4$]. According to the working principle of the asymmetric half-bridge flyback converter, the zero voltage switching (ZVS) of power transistors can be realized accordingly. In this example, the maximum withstand voltage of power transistors Q1, Q2, Q3, and Q4 can be decreased based on the control and switching for the values of voltage signal $V_r$ generated by the multi-level generating circuit, and the switching stress and switching losses may accordingly be lowered. For the isolated topology with the transformer, the requirement for the turns ratio of the transformer may also be reduced.

Figure 2F:
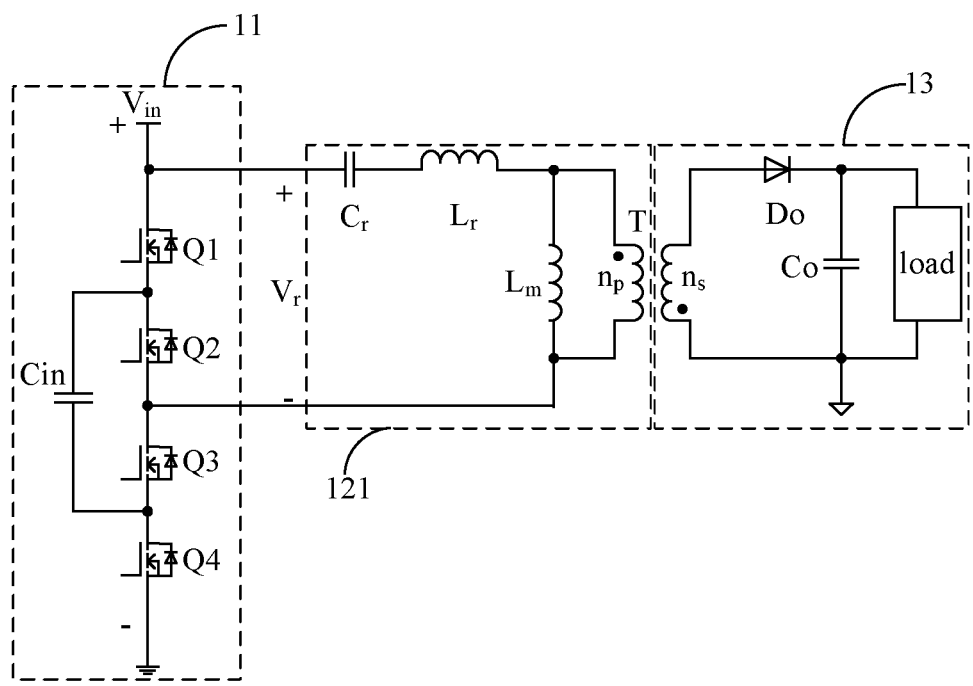
FIG. 2F is a schematic block diagram of a third example resonant switching converter, in accordance with embodiments of the present invention.

Referring now to FIG. 2F, shown is a schematic block diagram of a third example resonant switching converter, in accordance with an embodiment of the present invention. In this example, the operation principle of the resonant switching converter including multi-level generating circuit 11 is similar to that of the resonant switching converter shown in FIG. 2A. In this particular example, the output terminals of multi-level generating circuit 11 is the positive terminal of input voltage $V_{in}$ and the second common node between transistors Q2 and Q3.

In another example of the present invention, multi-level generating circuit 11 in the resonant switching converter can include N half-bridge circuit units coupled in series between two terminals of input voltage $V_{in}$, where each of the half-bridge circuit units can include two power transistors connected in series, and N capacitors can respectively connect between two input terminals of a corresponding one of the N half-bridge circuit units, where N≥2. Multi-level generating circuit 11 can generate voltage signal $V_r$ at the output terminals, and control the non-zero value of voltage signal $V_r$ may be a value such as $V_{in}/N$, $2V_{in}/N$, and so on.

Figure 3A:
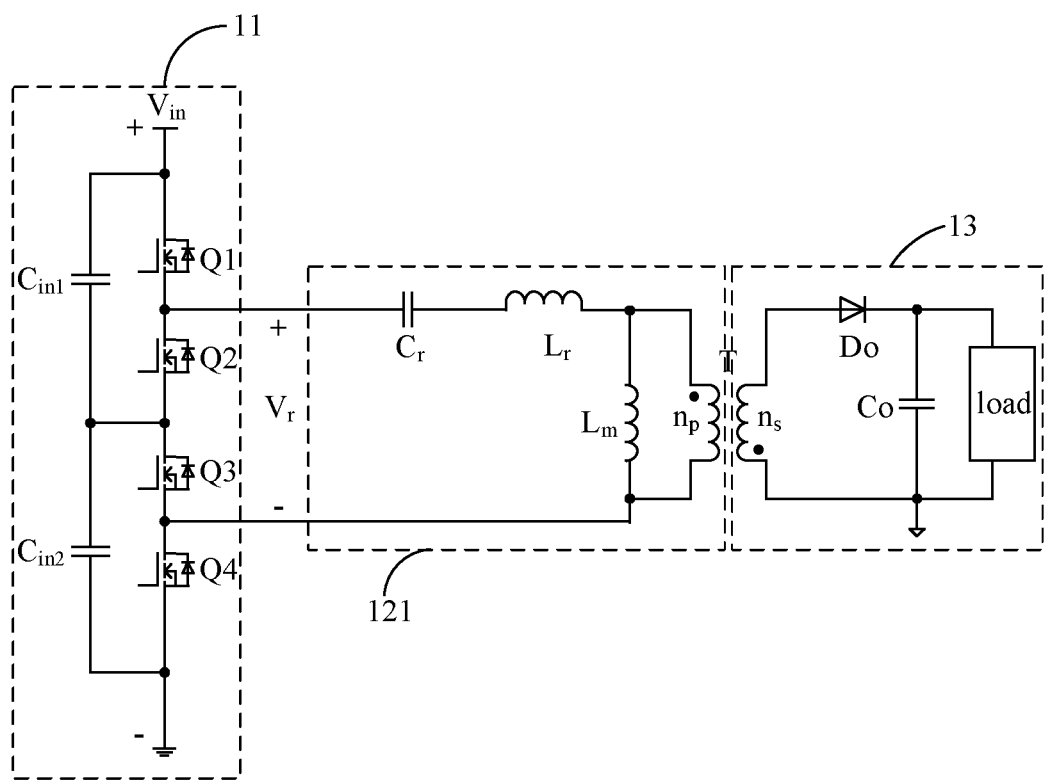
FIG. 3A is a schematic block diagram of a fourth example resonant switching converter, in accordance with embodiments of the present invention.

Referring now to FIG. 3A, shown is a schematic block diagram of a fourth example resonant switching converter, in accordance with embodiments of the present invention. This example resonant switching converter can include multi-level generating circuit 11 including two half-bridge circuits coupled in series between two terminals of input voltage $V_{in}$ as an example to illustrate. The first half-bridge circuit can include two power transistors Q1 and Q2 connected in series, and the second half-bridge circuit can include two power transistors Q3 and Q4 connected in series.

Multi-level generating circuit 11 can also include capacitors $C_{in1}$ and $C_{in2}$ coupled in series between two terminals of input voltage $V_{in}$. Capacitor $C_{in2}$ can connect between the two input terminals of the first half-bridge circuit. Capacitor $C_{in2}$ can connect between the two input terminals of the second half-bridge circuit. The output terminals of multi-level generating circuit 11 are the first common node between power transistors Q1 and Q2, and the second common node between power transistors Q3 and Q4. By controlling the switching states of four power transistors Q1, Q2, Q3, and Q4, various resonant controls can be realized with different equivalent switching frequencies and different input voltages of resonant branch 121.

Figure 3B:
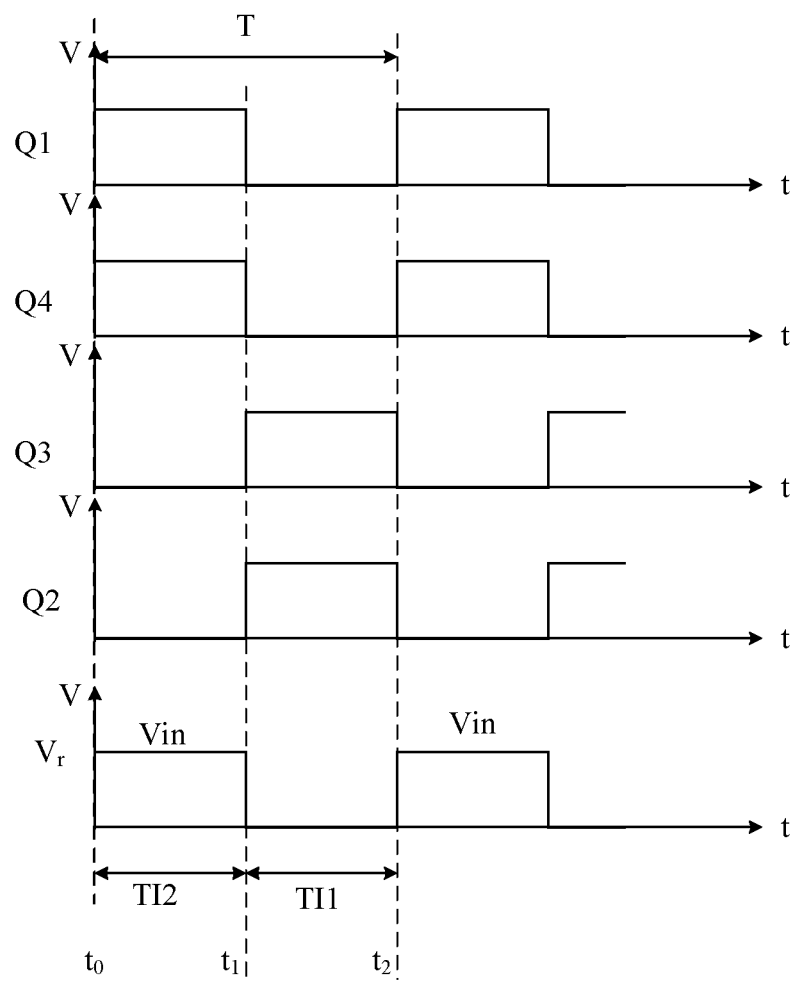
FIG. 3B is a waveform diagram of example operation of the resonant switching converter in FIG. 3A in a first operating mode, in accordance with embodiments of the present invention.

Referring now to FIG. 3B, shown is a waveform diagram of example operation of the resonant switching converter in FIG. 3A in a first operating mode, in accordance with embodiments of the present invention. In the first operating mode, multi-level generating circuit 11 may have four operating states during each switching cycle T, namely time intervals $[t_0$-$t_1]$, $[t_1$-$t_2]$ respectively, and time intervals TI1 (e.g., $t_0$-$t_1$) and TI2 (e.g., $t_1$-$t_2$) can change alternately.

During time interval $t_0$-$t_1$, power transistors Q1 and Q4 can be turned on at the same time, and power transistors Q2 and Q3 are turned off. The conduction path can be Vin-Q1-Cr-Lr-Lm-Q4 (e.g., ground terminal). The value of voltage signal $V_r$ may be input voltage $V_{in}$, and can be transmitted to the input terminals of resonant branch 121. In this way, magnetic inductor current $i_m$ and primary winding current $i_p$ may both increase linearly, and the values of the both are equal, such that transformer T can store energy, no energy may be transmitted to a secondary side of transformer T, and no current may flow through freewheeling diode Do. In this operating mode, the resonant switching converter can be regarded as an asymmetric flyback converter, and can multiplex power transistors Q1 and Q4 as the main power switch to realize resonance control.

During $t_1$-$t_2$ time interval, power transistors Q2 and Q3 may be turned on at the same time, and power transistors Q1 and Q4 can be turned off. The conduction path can be Q2-Cr-Lr-Lm (np)-Q3. The value of voltage signal $V_r$ may be switched to zero. In this way, magnetic inductor current $i_m$ can decrease linearly, and primary winding current $i_p$ can be the resonant current, such that the difference between magnetic inductor current $i_m$ and primary winding current $i_p$ may be transmitted to output circuit 13 through secondary winding $n_s$, and a current may flow through freewheeling diode Do. In this operating mode, the resonant switching converter can be regarded as an asymmetric flyback converter, and multiplex power transistors Q2 and Q3 as the clamp switch (e.g., the auxiliary power switch) to achieve resonance control. Repeatedly, as the value of voltage signal $V_r$ can be switched, the values of magnetic inductor current $i_m$ and primary winding current $i_p$ may cyclically be switched, and output circuit 13 can generate the corresponding output electrical signal to drive the load.

In the resonant switching converter of this example, two power transistors are simultaneously turned on in different operating modes, and are multiplexed as the main switch or clamp switch of the asymmetric half-bridge flyback converter to realize resonance control. According to the operating principle of the asymmetric half-bridge flyback converter, the ZVS of power transistors can be realized accordingly. In this example, the maximum withstand voltage of power transistors Q1, Q2, Q3, and Q4 can be decreased to $V_{in}/2$.

Figure 3C:
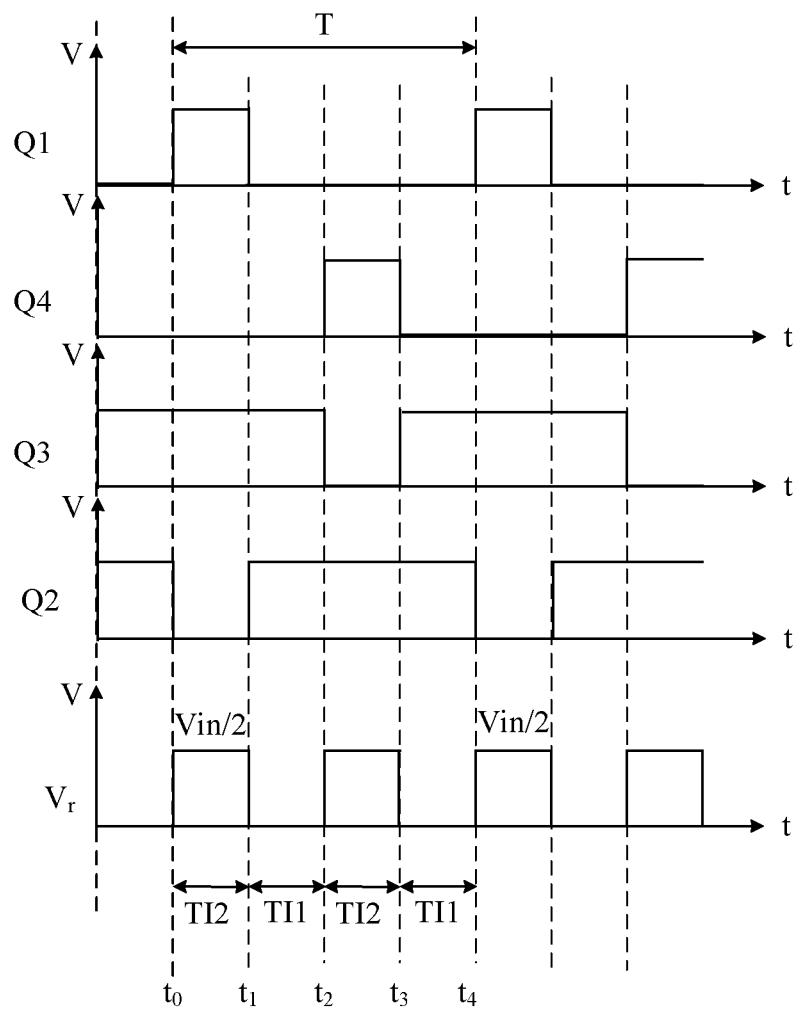
FIG. 3C is a waveform diagram of example operation of the resonant switching converter in FIG. 3A in a second operating mode, in accordance with embodiments of the present invention.

Referring now to FIG. 3C, shown is a waveform diagram of example operation of the resonant switching converter in FIG. 3A in a second operating mode, in accordance with embodiments of the present invention. In the second operating mode, the resonant tank that multiplexes power transistors in multi-level generating circuit 11 may have an equivalent twice the switching frequency, and the non-zero value of voltage signal $V_r$ can be half of input voltage $V_{in}$. During each switching cycle T, multi-level generating circuit 11 may have four operating states, namely time intervals $[t_0$-$t_1]$, $[t_1$-$t_2]$, $[t_2$-$t_3]$, and $[t_3$-$t_4]$, and time intervals TI1 (e.g., $t_1$-$t_2$ or $t_3$-$t_4$) and TI2 (e.g., $t_0$-$t_1$ or $t_2$-$t_3$) can change alternately.

During time interval $t_0$-$t_1$, power transistors Q1 and Q3 can be turned on at the same time, and power transistors Q2 and Q4 may be turned off. The conduction paths can be Vin-Q1-Cr-Lr-Lm-Q3-Cin2—ground terminal and the positive terminal of Cin1(Vin)-Q1-Cr-Lr-Lm-Q3—the negative terminal of $C_{in1}$. Capacitor $C_{in1}$ can be in a discharging state, capacitor Cin2 may be in a charging state, and the sum of the voltages of capacitors $C_{in1}$ and $C_{in2}$ can be input voltage $V_{in}$. The value of voltage signal $V_r$ may be voltage Vcin1 across capacitor $C_{in1}$; that is, half of the input voltage $V_{in}/2$, and may be transmitted to the input terminals of resonant branch 121. In this way, magnetic inductor current $i_m$ and primary winding current $i_p$ may both increase linearly, and the values of both are equal, such that transformer T can store energy, no energy may be transmitted to a secondary side of transformer T, and no current may flow through freewheeling diode Do.

During time interval $t_1$-$t_2$, power transistors Q2 and Q3 are turned on at the same time, and power transistors Q1 and Q4 are turned off. The conduction path can be Q2-Cr-Lr-Lm (np)-Q3. The value of voltage signal $V_r$ may be switched to zero. In this way, magnetic inductor current $i_m$ can decrease linearly, and primary winding current $i_p$ can be the resonant current, such that the difference between magnetic inductor current $i_m$ and primary winding current $i_p$ may be transmitted to output circuit 13 through secondary winding $n_s$, and a current may flow through freewheeling diode Do.

During $t_2$-$t_3$ time interval, power transistors Q2 and Q4 are turned on at the same time, and power transistors Q1 and Q3 are turned off. The conduction paths are the positive terminal of Cin2-Q2-Cr-Lr-Lm-Q4 (ground terminal) and Vin-Vcin1-Q2-Cr-Lr-Lm-Q4 (e.g., ground terminal). Capacitor $C_{in1}$ can be in a charging state, and capacitor $C_{in2}$ may be in a discharging state, and the sum of the voltages of capacitors $C_{in1}$ and $C_{in2}$ can be input voltage $V_{in}$. The value of voltage signal $V_r$ may be the voltage across capacitor $C_{in2}$; that is, half of the input voltage $V_{in}/2$, and can be transmitted to the input terminals of resonant branch 121. In this way, magnetic inductor current $i_m$ and primary winding current $i_p$ may both increase linearly, and the values of both are equal, such that transformer T can store energy, no energy may be transmitted to a secondary side of transformer T, and no current may flow through freewheeling diode Do.

During $t_3$-$t_4$ time interval, power transistors Q2 and Q3 can be turned on at the same time, and power transistors Q1 and Q4 may be turned off. The conduction path can be Q2-Cr-Lr-Lm (np)-Q3. The value of voltage signal $V_r$ may be switched to zero. In this way, magnetic inductor current $i_m$ can decrease linearly, and primary winding current $i_p$ can be the resonant current, such that the difference between magnetic inductor current $i_m$ and primary winding current $i_p$ may be transmitted to output circuit 13 through secondary winding $n_s$, and a current may flow through freewheeling diode Do. Repeatedly, as the value of voltage signal $V_r$ can be switched, the values of magnetic inductor current $i_m$ and primary winding current $i_p$ may cyclically be switched, and output circuit 13 can generate the corresponding output electrical signal to drive the load.

In this example, the resonant switching converter can be regarded as an asymmetric half-bridge flyback converter, and can multiplex the power switches in the multi-level generation circuit, namely power transistors Q1, Q2, Q3, and Q4. Under different operating modes, the two of power transistors Q1, Q2, Q3, and Q4 that are in on states are equivalent to the main switch and clamp switch in the asymmetric half-bridge flyback converters, respectively. Further, power transistors Q1 and Q3 may simultaneously be turned on during time interval $t_1$-$t_2$, and power transistors Q2 and Q4 may simultaneously be turned on in time interval $t_2$-$t_3$, which may be equivalent to the main switch of the asymmetric half-bridge flyback.

Power transistors Q2 and Q3 may simultaneously be turned on in time intervals $t_1$-$t_2$ and $t_3$-$t_4$, which can be equivalent to the clamp switch of the asymmetric half-bridge flyback converter. In this example, the maximum withstand voltage of power transistors Q1, Q2, Q3, and Q4 can be decreased to $V_{in}/2$ based on the control and switching for the values of voltage signal $V_r$ generated by the multi-level generating circuit, and the switching stress and switching losses may accordingly be lowered. For the isolated topology with the transformer, the requirement for the turns ratio of the transformer can also be reduced. On the other hand, in one switching cycle, two resonance control processes can be completed, which may be equivalent to increasing the switching frequency of the resonant tank, and may be more advantageous for achieving high frequency operation, thereby reducing the size and cost of the system circuit.

Figure 3D:
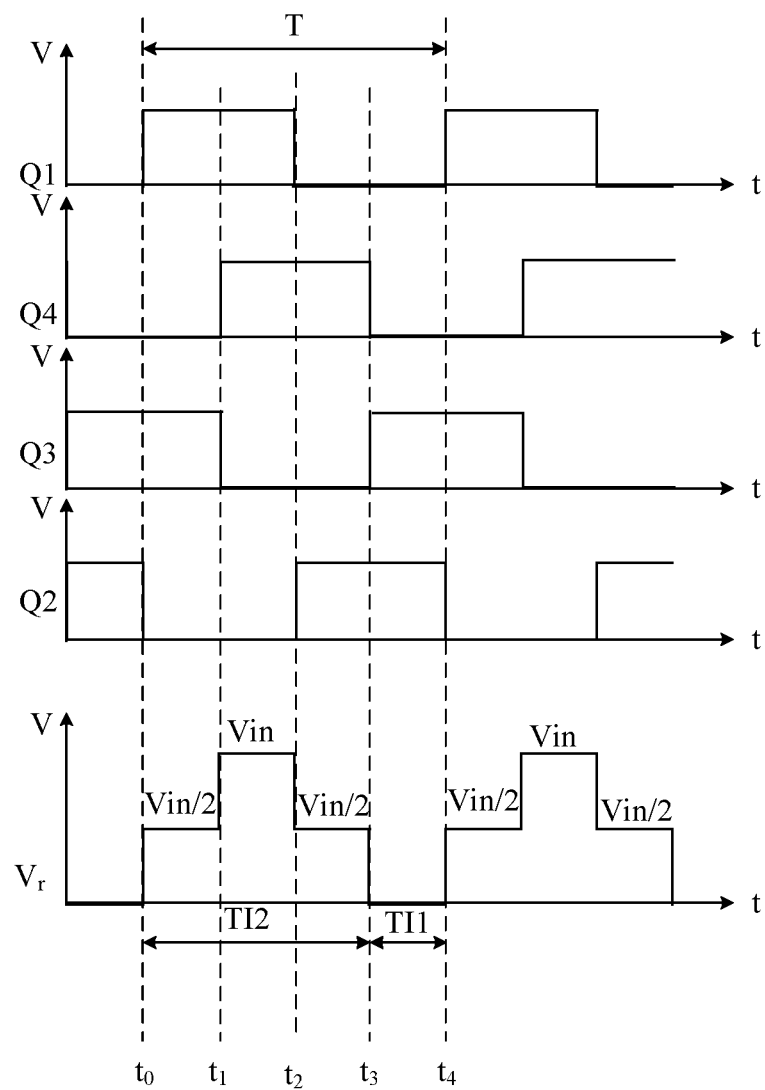
FIG. 3D is a waveform diagram of example operation of the resonant switching converter in FIG. 3A in a third operating mode, in accordance with embodiments of the present invention.

Referring now to FIG. 3D, shown is a waveform diagram of example operation of the resonant switching converter in FIG. 3A in a third operating mode, in accordance with embodiments of the present invention. In the third operating mode, multi-level generating circuit 11 has four operating states during each switching cycle T, namely time intervals [$t_0$-$t_1$], [$t_1$-$t_2$], [$t_2$-$t_3$], and [$t_3$-$t_4$], and first type time interval TI1 (e.g., $t_3$-$t_4$) and second type time interval TI2 (e.g., $t_0$-$t_3$) can change alternately.

During time interval $t_0$-$t_1$, power transistors Q1 and Q3 can be turned on at the same time, and power transistors Q2 and Q4 may be turned off. The conduction path can be Vin-Q1-Cr-Lr-Lm-Q3-Cin2 (e.g., ground terminal) and Cin1-Q1-Cr-Lr-Lm-Q3—the negative terminal of $C_{in1}$. Capacitor $C_{in1}$ may be in a discharging state, capacitor $C_{in2}$ can be in a charging state, and the sum of the voltages of capacitor $C_{in1}$ and $C_{in2}$ may be input voltage $V_{in}$. The value of voltage signal $V_r$ can be voltage Vcin1 across capacitor $C_{in1}$; that is, half of the input voltage $V_{in}/2$, and may be transmitted to the input terminals of resonant branch 121. In this way, magnetic inductor current $i_m$ and primary winding current $i_p$ may both increase linearly, and the values of both can be equal, such that transformer T can store energy, no energy may be transmitted to a secondary side of transformer T, and no current may flow through freewheeling diode Do.

During time interval $t_1$-$t_2$, power transistors Q1 and Q4 are turned on at the same time, and power transistors Q2 and Q3 are turned off. The conduction path may be Vin-Q1-Cr-Lr-Lm-Q4 (ground terminal). The value of voltage signal $V_r$ can be input voltage $V_{in}$, and may be transmitted to the input terminals of resonant branch 121. In this way, magnetic inductor current $i_m$ and primary winding current $i_p$ may both increase linearly, and the values of both can be equal, such that transformer T can store energy, no energy may be transmitted to a secondary side of transformer T, and no current may flow through freewheeling diode Do.

During time interval $t_2$-$t_3$, power transistors Q2 and Q4 can be turned on at the same time, and power transistors Q1 and Q3 may be turned off. The conduction paths can be the positive terminal of Cin2-Q2-Cr-Lr-Lm-Q4 (e.g., ground terminal) and Vin-Cin1-Q2-Cr-Lr-Lm-Q4 (e.g., ground terminal). Capacitor Cin1 may be in a discharging state, capacitor $C_{in2}$ can be in a charging state, and the sum of the voltages of capacitor $C_{in1}$ and $C_{in2}$ may be input voltage $V_{in}$. The value of voltage signal $V_r$ can be the voltage across capacitor $C_{in2}$, that is, half of the input voltage $V_{in}/2$, and may be transmitted to the input terminals of resonant branch 121. In this way, magnetic inductor current $i_m$ and primary winding current $i_p$ may both increase linearly, and the values of both can be equal, such that transformer T can store energy, no energy may be transmitted to a secondary side of transformer T, and no current may flow through freewheeling diode Do.

During time interval $t_3$-$t_4$, power transistors Q2 and Q3 are turned on at the same time, and power transistors Q1 and Q4 are turned off. The conduction path may be Q2-Cr-Lr-Lm (np)-Q3. The value of voltage signal $V_r$ can be switched to zero. In this way, magnetic inductor current $i_m$ can decrease linearly, and primary winding current $i_p$ may be the resonant current, such that the difference between magnetic inductor current $i_m$ and primary winding current $i_p$ can be transmitted to output circuit 13 through secondary winding $n_s$, and a current may flow through freewheeling diode Do. Repeatedly, as the value of voltage signal $V_r$ may be switched, the values of magnetic inductor current $i_m$ and primary winding current $i_p$ are cyclically switched, and output circuit 13 can generate the corresponding output electrical signal to drive the load.

In this example, the resonant switching converter can be regarded as the asymmetric half-bridge flyback converter, and can multiplex the power switches in the multi-level generation circuit, namely power transistors Q1, Q2, Q3, and Q4. Under different operating modes, the two of power transistors Q1, Q2, Q3, and Q4 that are in on states can respectively replace the main switch and the clamp switch of the asymmetric half-bridge flyback converter, in order to achieve resonance control. In an operating state in which the value of voltage signal $V_r$ is not zero, the two power transistors in the on states can correspond to the main switch. In an operating state in which the value of voltage signal $V_r$ can be zero, the two power transistors in the on states can correspond to the clamp switch. According to the operating principle of the asymmetric half-bridge flyback converter, the ZVS of the power transistor can accordingly be realized.

In this example, the maximum withstand voltage of power transistors Q1, Q2, Q3, and Q4 can be decreased based on the control and switching for the values of voltage signal $V_r$ generated by the multi-level generating circuit, and the switching stress and switching losses are lowered accordingly. For an isolated topology with the transformer, the requirement for the turns ratio of the transformer may also be reduced.

In another example, when the value of input voltage $V_{in}$ may be varied, for example, the AC input voltage, the two operating modes shown in FIGS. 3B and 3C can be switched according to the value of input voltage $V_{in}$. When the value of input voltage $V_{in}$ is relatively small, the operation mode shown in FIG. 3B may be selected, and the value of the input voltage may not be converted, and rather can be maintained as input voltage $V_{in}$. When the value of input voltage $V_{in}$ is relatively large, the operation mode shown in FIG. 3C can be selected, and the value of the input voltage may be converted to reduce the value of voltage signal $V_r$ input to the resonance branch, and the withstand voltage of the power transistors can also be reduced.

In particular embodiments, in an isolated flyback topology, the structure of the multi-level generation circuit can include a four-switch circuit structure, and the voltage division ratio of the input voltage can be ½ or 1. It can be understood that other types of topologies can be applied, such as an asymmetric half-bridge forward converter, and the circuit structure of the multi-level generating circuit can also be other circuit structures, such as switched capacitor conversion structure having six-switch and eight-switch, or another type of suitable switched capacitor conversion structure.

In this example, the input voltage of the resonant switching converter can be changed by a multi-level generating circuit that can generate multi-level voltages, in order to generate the corresponding output electrical signal with equivalent higher switching frequency. The resonant branch connected to the multi-level generating circuit can form the resonant tank with part or all of the power transistors in the multi-level generating circuit, thereby realizing resonance control. For example, the voltage stress of each power transistor may be reduced, and the switching frequency can be increased equivalently, which may be more conducive to the realization of high frequency operation, and can reduce the volume and cost of the system. In addition, the performance requirements of other devices in the system circuit may also be reduced, including the withstand voltage of resonant component and freewheeling diode, and turns ratio of the transformer.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A resonant switching converter, comprising:
   a) a multi-level generating circuit configured to generate a first voltage signal having at least two values, wherein said first voltage signal is zero in a first time interval, and is not zero and not greater than an input voltage of said resonant switching converter in a second time interval;
   b) a resonant tank configured to multiplex at least two power transistors in said multi-level generating circuit, and to receive said first voltage signal to achieve resonant control; and
   c) said multi-level generating circuit being configured to control said first voltage signal in accordance with said input voltage, wherein a ratio of said first voltage signal to said input voltage is relatively large in said second time interval when said input voltage is relatively small, and said ratio of said first voltage signal to said input voltage in said second time interval is relatively small when said input voltage is relatively large.

2. The resonant switching converter of claim 1, wherein said first time interval and second time interval are alternately changed during each switching cycle.

3. The resonant switching converter of claim 2, wherein a change frequency of said first type time interval and second time interval is an integral multiple of a switching frequency of said resonant switching converter during each switching cycle.

4. The resonant switching converter of claim 1, wherein said input voltage is an integral multiple of said first voltage signal in said second time interval during each switching cycle.

5. The resonant switching converter of claim 1, wherein said first voltage signal in said second time interval has different values during each switching cycle.

6. The resonant switching converter of claim 1, wherein said resonant tank is configured to:
   a) transmit power to an output side of said resonant switching converter during said first time interval; and
   b) store energy and not to transmit power to said output side during said second time interval, and vice versa.

7. The resonant switching converter of claim 1, wherein operation states of said power transistors are controlled to switch conductive paths of said multi-level generating circuit, in order to provide said first voltage signal having different values to said resonant tank.

8. The resonant switching converter of claim 1, wherein operation states of said power transistors are controlled to make sure that said first voltage signal provided to said resonant tank is generated through said input voltage, first capacitances and power transistors in on-states or only through first capacitances and power transistors in on-states in said multi-level generating circuit during each switching cycle.

9. The resonant switching converter of claim 1, wherein said multi-level generating circuit comprises:

a) 2 N power transistors coupled in series between two terminals of said input voltage, which result in 2 N−1 common nodes, wherein N is a positive integer of at least two; and b) M first capacitances, coupled in series between (N−M)th and (N+M)th common nodes, wherein M is a positive integer of at least one, and 1≤M≤(N−1).

10. The resonant switching converter of claim 9, wherein input terminals of a resonant branch in said resonant tank are coupled between a Nth common node and a negative terminal of said input voltage.

11. The resonant switching converter of claim 10, wherein:

a) power transistors coupled between input terminals of said resonant branch are in on states during said first time interval;

b) a length of said first time interval is adjusted by controlling switching states of said power transistors coupled between input terminals of said resonant branch; and c) said first voltage signal has different values during said second time interval.

12. The resonant switching converter of claim 11, wherein:

a) said first voltage signal having a value of 1/N of said input voltage is provided to said resonant branch through a first conductive path comprising said input voltage, first capacitances and power transistors in on states; and b) said first voltage signal having a value of 1/N of said input voltage is provided to said resonant branch through a second conductive path comprising said input voltage and power transistors in on states, and a frequency for switching said first conductive path and second conductive path is N times of an operating frequency of said power transistors.

13. The resonant switching converter of claim 9, wherein input terminals of a resonant branch in said resonant tank are coupled between a Nth common node and a positive terminal of said input voltage.

14. The resonant switching converter of claim 9, wherein operation states of said power transistors are controlled to make sure that said first voltage signal having different ratios to said input voltage provided to said resonant tank is generated through said input voltage, first capacitances or only through first capacitances and power transistors in on-states in said multi-level generating circuit during each switching cycle.

15. The resonant switching converter of claim 1, wherein said multi-level generating circuit comprises:

a) N half-bridge circuit units coupled in series between two terminals of said input voltage, wherein each half-bridge circuit unit comprises two power transistors coupled in series; and b) N first capacitances, each of which being coupled between input terminals of a corresponding one of said half-bridge circuit units, wherein N is a positive integer of at least two.

16. The resonant switching converter of claim 15, wherein input terminals of a resonant branch in said resonant tank are coupled between output terminals of one of said half-bridge circuit units.

17. The resonant switching converter of claim 15, wherein:

a) power transistors coupled between input terminals of said resonant branch are in on states during said first time interval;

b) a length of said first time interval is adjusted by controlling switching states of said power transistors coupled between input terminals of said resonant branch; and c) said first voltage signal having different values is generated during said second time interval.

18. The resonant switching converter of claim 17, wherein:

a) said first voltage signal having a value of 1/N of said input voltage is provided to said resonant branch through a first conductive path comprising said input voltage, first capacitances and power transistors in on states; and b) said first voltage signal having a value of 1/N of said input voltage is provided to said resonant branch through a second conductive path comprising said input voltage and power transistors in on states, and a frequency for switching said first conductive path and second conductive path is N times of an operating frequency of said power transistors.

19. The resonant switching converter of claim 15, wherein operation states of said power transistors are controlled to make sure that said first voltage signal having different ratios to said input voltage provided to said resonant tank is generated through said input voltage, first capacitances or only through first capacitances and power transistors in on-states in said multi-level generating circuit during each switching cycle.

* * * * *